United States Patent [19]

Nagano et al.

[11] Patent Number: 5,432,422
[45] Date of Patent: Jul. 11, 1995

[54] METHOD AND APPARATUS FOR CONTROLLING THE POSITIONING AND REDUCING VIBRATION IN A MACHINE TOOL SYSTEM

[75] Inventors: Tetsuaki Nagano; Yasuhiko Iwai, both of Aichi; Masato Koyama, Hyogo, all of Japan

[73] Assignee: Mitsubishi Denki Kabushiki Kaisha, Tokyo, Japan

[21] Appl. No.: 128,665

[22] Filed: Sep. 30, 1993

[30] Foreign Application Priority Data

Sep. 30, 1992 [JP] Japan ................... 4-261494

[51] Int. Cl.⁶ ............... G05B 5/01; H02P 5/00
[52] U.S. Cl. .................... 318/611; 318/687
[58] Field of Search ............ 318/560, 561, 566, 611, 318/619, 623, 629, 632, 687, 460

[56] References Cited

U.S. PATENT DOCUMENTS

| | | | |
|---|---|---|---|
| 4,250,438 | 2/1981 | Onoda | 318/561 |
| 4,417,489 | 11/1983 | Liu | 82/1 C |
| 5,117,544 | 6/1992 | Kousaku et al. | 29/27 C |
| 5,142,210 | 8/1992 | Kojima et al. | 318/566 |
| 5,159,254 | 10/1992 | Teshima | 318/611 |

FOREIGN PATENT DOCUMENTS

| | | |
|---|---|---|
| 0252201 | 1/1988 | European Pat. Off. . |
| 62-235602 | 10/1987 | Japan . |
| 1136582 | 5/1989 | Japan . |
| 282303 | 3/1990 | Japan . |
| 9204663 | 3/1992 | WIPO . |

OTHER PUBLICATIONS

Soviet Engineering Research (Stanki I Instrumenty & Vestnik Mashinostroenia Mashinostrocnie), vol. 12, No. 3, '92, New York US pp. 65–70, XP358240 Khomyakov V. S., Chepenko V. L. & Sevryugin "Formation of Waviness During Thread Grinding and Ways to Reduce it", p. 67, para. 3, p. 70, line 7.
Database WPI, Week 7938, Derwent Publication Ltd., London, GB; AN 79-J0846B 38 & SU-A-637-782, (Roag Rost Agri Equip) 20 Dec. 1978.
Database WPI, Section EI, Week 8202, Derwent Publications Ltd., London, GB; Class T06, AN 82-A35882E 02 & SU-A-815 715 (Ulyan Heavy Milling) 23 Mar. 1981.

*Primary Examiner*—Bentsu Ro
*Attorney, Agent, or Firm*—Sughrue, Mion, Zinn, Macpeak & Seas; Richard C. Turner

[57] ABSTRACT

A positioning control apparatus for accurately positioning a tool and workpiece and for reducing the vibration related to positioning. The system comprises a machining table fitted with a workpiece and designed to be movable on a bed. A first detector detects the acceleration of the machining table in a moving direction, and a second detector detects the acceleration in the moving direction of a tool fitted to a column that also is coupled with the bed. The outputs of the first and second detectors are used to suppress the relative vibration of the workpiece fitted to the machining table and the tool fitted to the column in the moving direction.

18 Claims, 18 Drawing Sheets

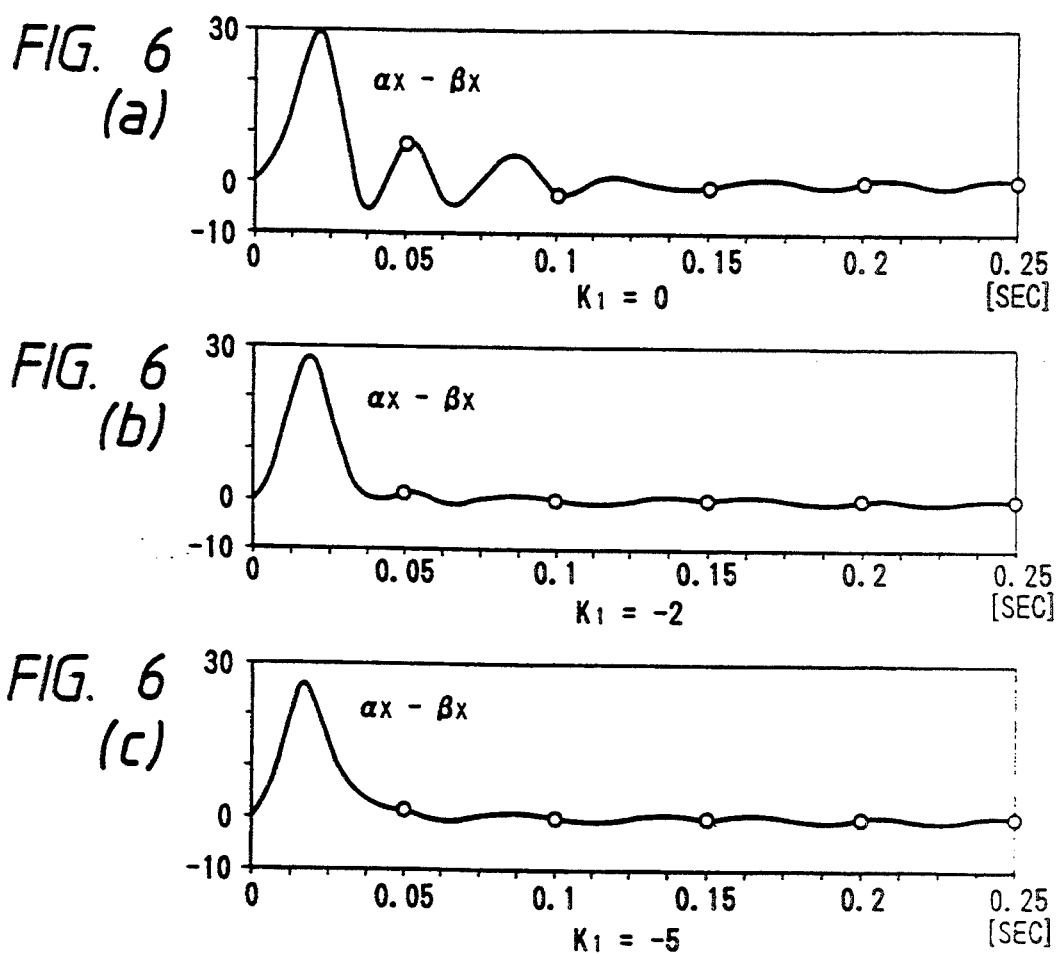

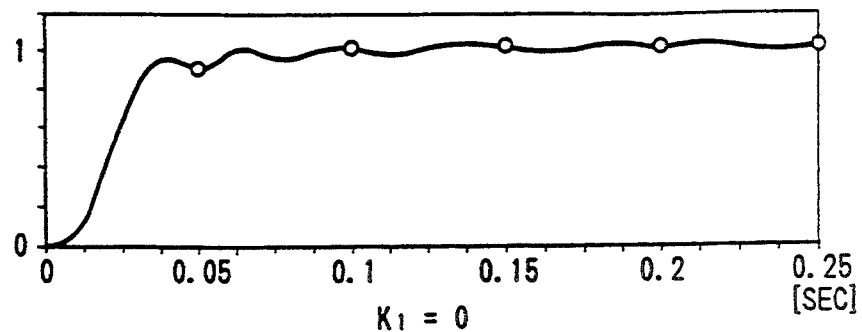
FIG. 9 (a)  $K_1 = 0$
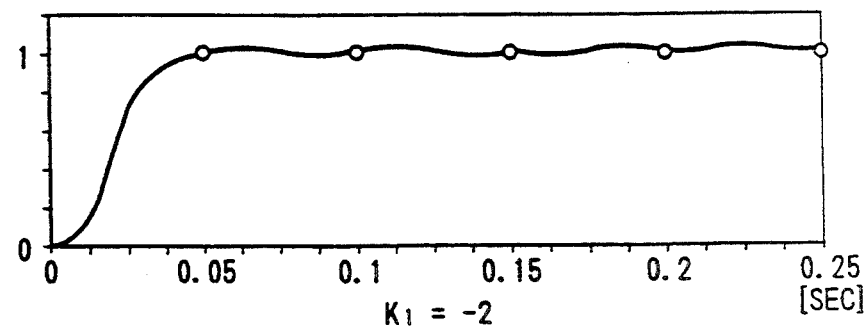
FIG. 9 (b)  $K_1 = -2$
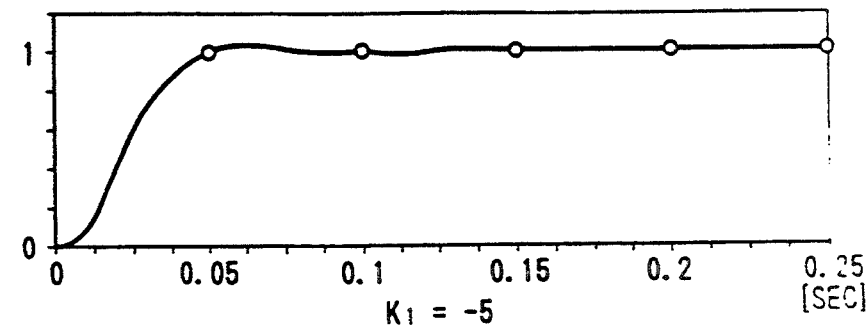
FIG. 9 (c)  $K_1 = -5$

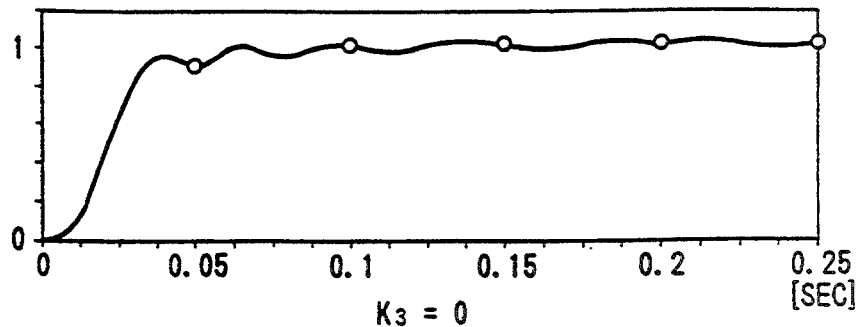
FIG. 19 (a)  K3 = 0
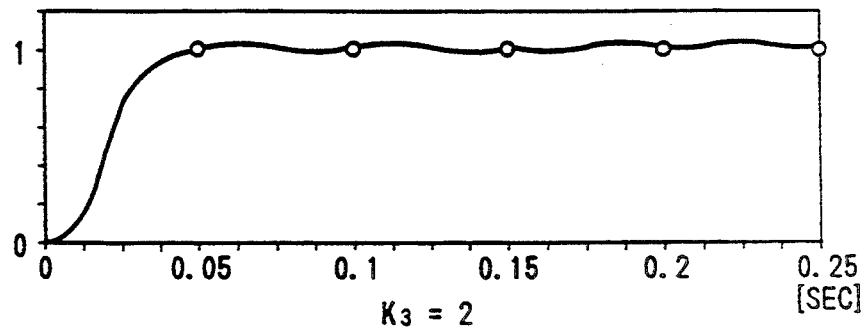
FIG. 19 (b)  K3 = 2
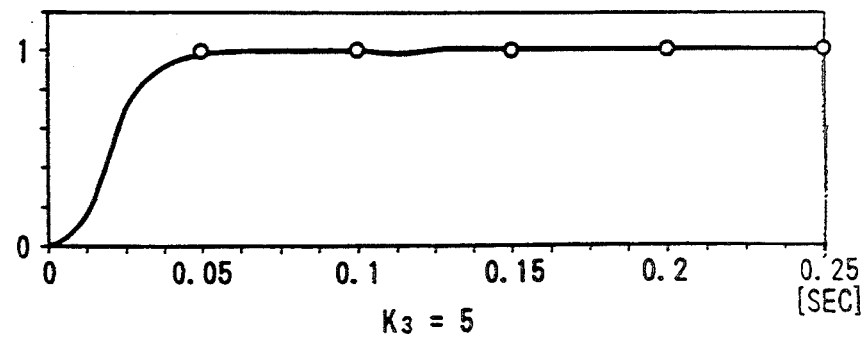
FIG. 19 (c)  K3 = 5

PRIOR ART

METHOD AND APPARATUS FOR CONTROLLING THE POSITIONING AND REDUCING VIBRATION IN A MACHINE TOOL SYSTEM

BACKGROUND OF THE INVENTION

1. Field of the Invention

The present invention relates to a positioning control method and a positioning control apparatus which suppress mechanical vibration resulting from the movement, stop, etc., of a workpiece or a tool and exercise smooth relative position control of the workpiece and tool on a general machine tool, such as a turret punch press, or a machine tool such as a laser cutting machine, an electrical discharge machine or a wire bonding apparatus.

2. Description of the Background Art

There are conventional devices that serve as a positioning control apparatus for controlling, for example, a workpiece in a general machine tool, such as a turret punch press, or a machine tool such as a laser cutting machine, an electrical discharge machine or a wire bonding apparatus (hereinafter referred to as the machine tool), which suppresses the vibration of a movable part by detecting the acceleration of the movable part and feeding the result of detection back to a control section. FIG. 24 shows an apparatus disclosed in Japanese Laid-Open Patent Publication No. 136582 of 1989. In FIG. 24, the numeral 1 indicates a servo amplifier, 2 denotes a driving apparatus, e.g., a motor, 3 represents transmission means consisting of a joint and a lead screw, 4 designates a movable part, such as a traveling table, which is moved by the transmission means 3, 5 indicates a tacho-generator for detecting the velocity VD of the driving apparatus 2, 6 shows acceleration detector means for detecting the acceleration aL of the movable part 4, 7 designates an integrator for integrating the acceleration aL detected by the acceleration detector means 6 and providing the velocity VL of the movable part 4, 8 represents an amplifier for amplifying a difference VL−VD between the velocity VL of the movable part 4 and the velocity VD of the driving apparatus 2, and 9 indicates a filter.

The difference VL−VD between velocity VL provided by integrating the acceleration aL of the movable part 4 and the velocity VD of the driving apparatus 2 is the extraction of movable part 4 vibration attributable to mechanical natural oscillation. The vibration of the movable part 4 is suppressed by feeding back the signal of that difference with polarity as indicated in the drawing through the amplifier 8 of appropriate gain and the filter 9 of proper time constant.

In the meantime, the machine tool is designed to move movable parts, e.g., a machining table and a tool member in the directions of two or more axes, i.e., an X-axis direction, a Z-axis direction (and/or a Y-axis direction). Since a workpiece is machined by the relative motion of the workpiece and tool member fixed on their corresponding movable parts of the machine tool, it is important to suppress the detrimental relative vibration of the workpiece and tool member in improving machining accuracy. This vibration problem will now be described with reference to the drawings.

FIG. 25 is a simplified diagrammatic view of a machine tool, wherein 4 indicates a machining table acting as a first movable part which can be moved in the X-axis direction, 2 designates a first driving apparatus for driving the machining table 4 in the X-axis direction, 5 denotes position detector means for detecting, for example, the angular position of the first driving apparatus 2, 3 indicates first transmission means consisting of a joint and a lead screw which transmit the driving force of the first driving apparatus 2, 260 shows a bed on which the machining table 4, first driving apparatus 2, etc. are mounted, 261 represents a machining head serving as a second movable part which can be moved in the Z-axis direction, 262 shows a second driving apparatus for driving the machining head 261, 263 indicates second transmission means consisting of a joint and a lead screw which transmit driving force to the machining head 261, and 264 denotes a column on which the machining head 261 and second driving apparatus 262 are mounted.

The conventional apparatus constructed as described above machines a workpiece to a desired shape while simultaneously controlling the positions of the machining table 4 secured with the workpiece in the X-axis direction and the machining head 261 loaded with a tool in the Z-axis direction by means of the first and second driving apparatuses 2, 262 via the first and second transmission means 3, 263, respectively. In the process of machining this workpiece, when the machining table 4 is accelerated or decelerated in the X-axis direction, the machining table 4 vibrates in the X-axis direction since the first transmission means 3 is made of an elastic material. Further, the bed 260 vibrates due to the reaction to the acceleration or deceleration of the machining table 4, whereby deflective vibration in the X-axis direction takes place in the column 264.

FIG. 26($a$) is a waveform diagram which illustrates the acceleration $\beta X$ of the machining head 261, the acceleration $\alpha X$ of the machining table 4, and the relative acceleration $\alpha X - \beta X$ of the two when the machining table 4 at a stop is moved in the +X-axis direction on a conventional apparatus for which measures against vibration have not been taken. As shown in FIGS. 26($a$) and 26($c$), when the machining table 1 is started without vibration measures being taken, the relative acceleration waveform of the machining table 4 and machining head 261 contains more detrimental residual vibration as compared to the acceleration waveform of the machining table 4. Consequently, the machined surface of the workpiece is undulated due to the X-axis direction relative vibration of the machining table 4 and machining head 261, thereby degrading machining accuracy. Therefore, the vibration problem caused by the relative vibration of the machining table 4 and machining head 261 could not be solved satisfactorily by merely detecting the acceleration of only one axis, e.g., the machining table 4, and making feedback compensation as in the conventional apparatus shown in FIG. 24.

It is, accordingly, an object of the present invention to overcome the disadvantages in the conventional apparatus by providing a positioning control method which suppresses relative vibration and achieves high-speed, accurate positioning control and an apparatus which carries out that method.

SUMMARY OF THE INVENTION

A positioning control method concerned with the present invention comprises the steps of: fitting to a movable member one of a workpiece and a tool member for machining said workpiece, arranging said movable member to be movable on a first member, and fitting the other of said workpiece and tool member to a second member coupled with said first member; providing both of the acceleration component of said movable member or one of the workpiece and tool member fitted to said movable member in said moving direction or a component which allows the calculation of said acceleration component and the acceleration component of said second member or the other of the workpiece and tool member fitted to said second member in said moving direction of said movable member or a component which allows the calculation of said acceleration component; and inputting both of said components to drive means of said movable member to suppress the relative vibration of said movable member or one of the workpiece and tool member fitted to said movable member and said second member or the other of the workpiece and tool member fitted to said second member in said moving direction on the basis of said input.

A positioning control apparatus concerned with the present invention comprises: a movable member fitted with one of a workpiece and a tool member for machining said workpiece and arranged to be movable on a first member; first detector means for detecting the acceleration component of said movable member or one of the workpiece and tool member fitted to said movable member or a component which allows the calculation of said acceleration component; a second member coupled with said first member and fitted with the other of said workpiece and tool member; second detector means for detecting the acceleration component of said second member or the other of the workpiece and tool member fitted to said second member in the moving direction of said movable member or a component which allows the calculation of said acceleration component; and vibration suppressor means for receiving components based on the detection components of said first and second detector means to suppress the relative vibration of said movable member or one of the workpiece and tool member fitted to said movable member and said second member or the other of the workpiece and tool member fitted to said second member in said moving direction.

A positioning control apparatus concerned with another embodiment of the invention comprises: a movable member which is designed to be movable on a first member and is fitted with one of a workpiece and a tool member and of which acceleration component or a component which allows the calculation of said acceleration component is detected by first detector means; drive means for providing driving force to said movable member; position component detector means for detecting the position component of said movable member driven by said drive means or one of the workpiece and tool member fitted to said movable member in said moving direction; command operating means for operating on a drive command to said drive means according to a command related to a position and the detection component of said position component detector means; drive control means for receiving the drive command from said command operating means to control said drive means; a second member coupled with said first member; second detector means for detecting the acceleration component of said second member or the other of the workpiece and tool member fitted to said second member in said moving direction or a component which allows the calculation of said acceleration component; and compensator means for receiving the detection component of said first detector means and the detection component of said second detector means and operating on a compensation value for suppressing the relative vibration of said movable member or one of the workpiece and tool member fitted to said movable member and the second member or the other of the workpiece and tool member fitted to said second member in said moving direction to compensate for the drive command to said drive means.

A positioning control apparatus concerned with a fourth feature further comprises: first compensator means for receiving the detection component of said first detector means and the detection component of said second detector means and operating on a first compensation value for suppressing the relative vibration of said movable member or one of the workpiece and tool member fitted to said movable member and the second member or the other of the workpiece and tool member fitted to said second member in said moving direction to compensate for the drive command to said drive means; model position output means for providing a model position component in said moving direction from portions including said drive means and said movable member; and second compensator means for operating on a second compensation value according to said position-related command and the model component from said model position output means to compensate for the drive command to said drive means.

A positioning control apparatus concerned with a further modification comprises: a model acceleration output means for receiving the command related to the position in said moving direction and providing a model acceleration component in said moving direction; and compensator means for receiving the detection component of said first detector means, the detection component of said second detector means, and the output of said model acceleration output means and operating on a compensation value for suppressing the relative vibration of said movable member or one of the workpiece and tool member fitted to said movable member and the second member or the other of the workpiece and tool member fitted to said second member in said moving direction in order to compensate for the drive command to said drive means.

BRIEF DESCRIPTION OF THE DRAWINGS

FIGS. 6(a) to 6(c) illustrate relative acceleration simulation waveform diagrams of a machining table and a machining head, which illustrates the effects of the invention.

FIGS. 9(a) to 9(c) illustrate relative acceleration simulation waveform diagrams of the machining table and machining head, which illustrates the effects of the invention.

FIGS. 19(a) to 19(c) illustrate relative displacement simulation waveform diagrams of the machining table and machining head, which illustrates the effects of the invention.

DESCRIPTION OF THE PREFERRED EMBODIMENTS

The positioning control method in accordance with the invention provides both of an acceleration component or calculable data of a first movable member or component fitted thereto in a moving direction and the acceleration component or calculable data of a second moveable member or component fitted thereto in a moving direction of the movable member, and inputs both of the components to the drive means of the first movable member to suppress the relative vibration of the first movable member or a component fitted thereto and the second member or component fitted thereto in said moving direction on the basis of said input.

The vibration suppressor apparatus in accordance with the invention utilizes the method to suppresses the relative vibration of a movable member or component fitted thereto which is movable on the first member and a second member which is connected to said first member or component fitted thereto in the moving direction of said movable member.

Figure 1:
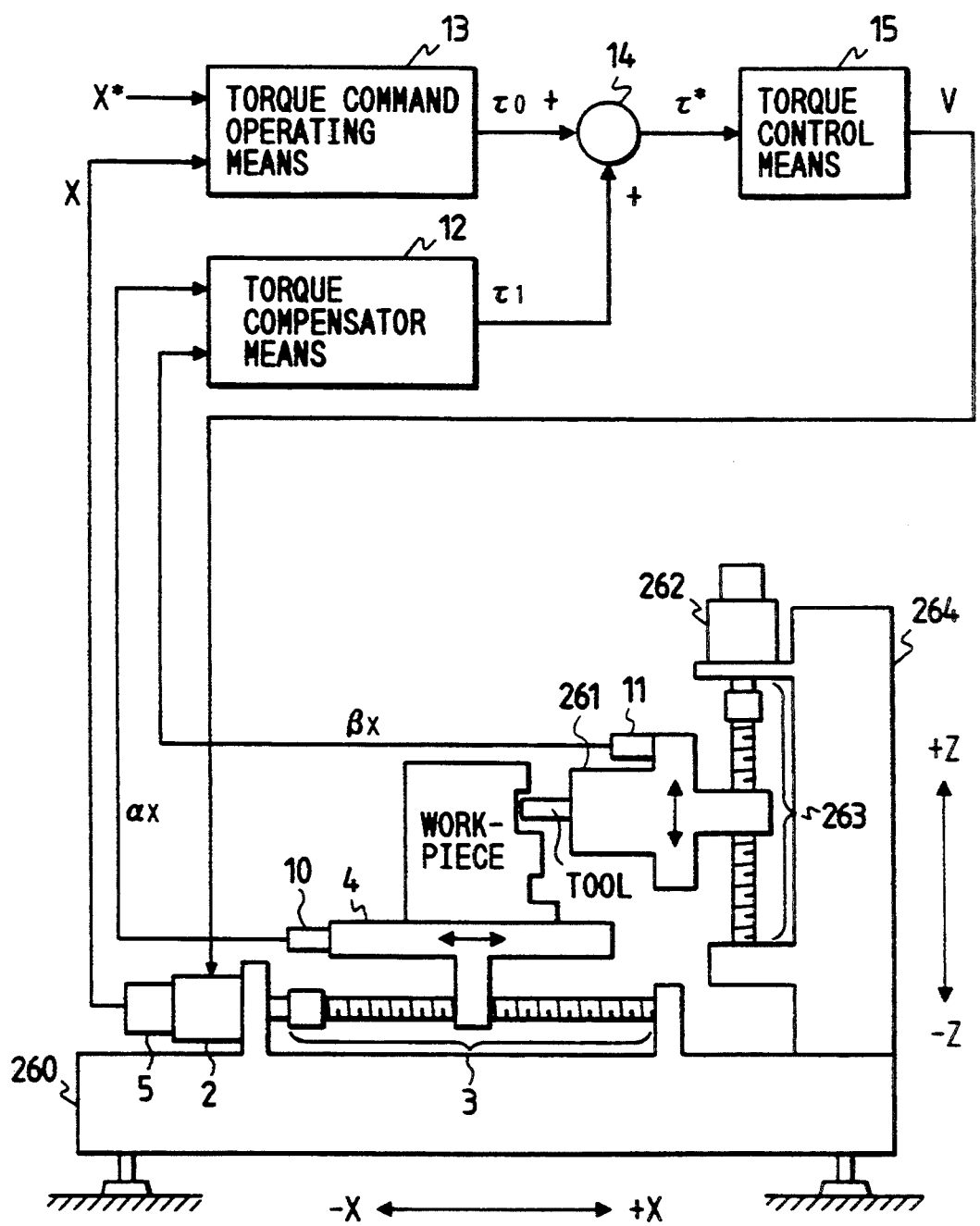
FIG. 1 is a block diagram which illustrates a preferred embodiment of the invention, wherein a positioning control apparatus applies to a machine tool.

A first embodiment of the invention will now be described with reference to FIGS. 1 to 7, wherein like reference characters designate like or corresponding parts in the conventional art. FIG. 1 is a block diagram showing an embodiment including a positioning control apparatus significant to the invention. Referring to FIG. 1, the numeral 10 indicates first acceleration detector for detecting the X-axis direction acceleration component $\alpha X$ of the machining table 4, 11 represents second acceleration detector for detecting the X-axis direction acceleration component $\beta X$ of the machining head 261, 12 denotes torque compensator for receiving the output $\alpha X$ of the first acceleration detector 10 and the output $\beta X$ of the second acceleration detector 11 and outputting a compensation value, e.g., a compensation torque command value T1, 13 designates command operating section, such as torque command operating unit, for outputting a command value, e.g., torque command value $\tau 0$, according to a command value related to a position provided from outside the apparatus, e.g., position command value $X^*$, and the output X of the position detector 5, 14 indicates an adder for adding the compensation torque command value $\tau 1$ to the torque command value $\tau 0$ and outputting a new command value, e.g., torque command value $\tau^*$, and 15 denotes drive controller, such as a torque controller, which controls torque generated by the first driving apparatus 2 according to the torque command value $\tau^*$. It should be noted that the tool and the machining head 261 together constitute a "tool member" in the present invention. The other parts are identical to those of the conventional art illustrated in FIG. 25 and therefore will not be described here.

Figure 2:
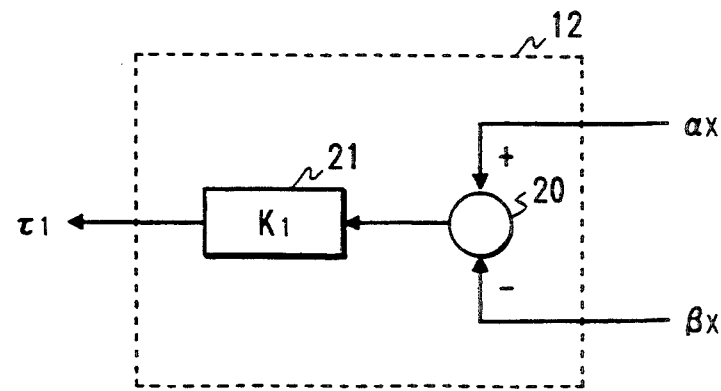
FIG. 2 is a block diagram illustrating a preferred embodiment of torque compensator means.

FIG. 2 shows an embodiment of the torque compensator 12, wherein 20 indicates subtractor for outputting a difference between the output $\alpha X$ of the first acceleration detector 10 and the output $\beta X$ of the second acceleration detector 11, and 21 designates a proportional amplifier for proportionally amplifying the output $\alpha X - \beta X$ of the subtractor 20 and outputting the compensation torque command value $\tau 1$ of polarity which will decrease the output $\alpha X - \beta X$ of the subtractor 20.

Figure 3:
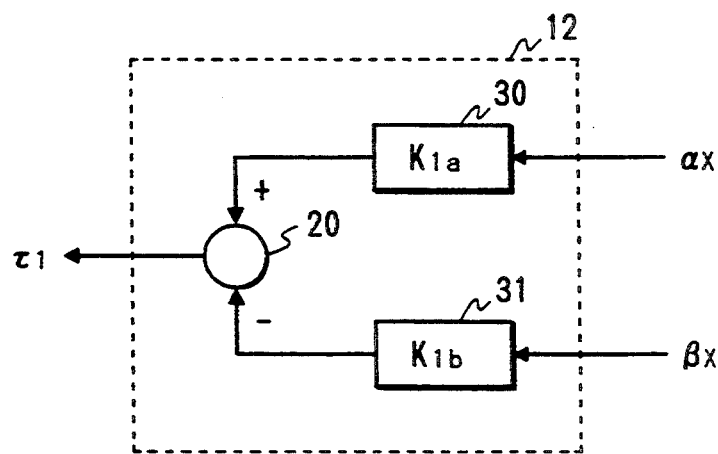
FIG. 3 is a block diagram illustrating another preferred embodiment of the torque compensator means.

FIG. 3 shows another embodiment of the torque compensator 12, wherein 30 and 31 denote proportional operation amplifiers for proportionally amplifying the output $\alpha X$ of the first acceleration detector 10 and the output $\beta X$ of the second acceleration detector 11, respectively, and 20 represents a subtractor for outputting a difference between the output of the proportional operation amplifier 30 and the output of the proportional operation amplifier 31.

Figure 26:
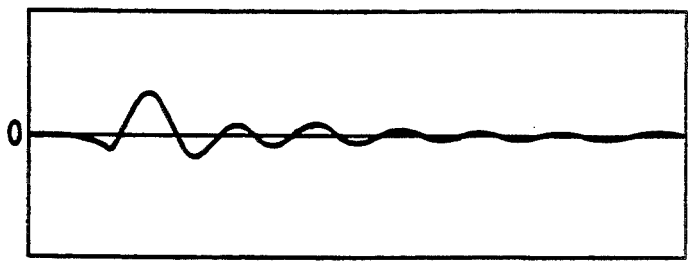
FIGS. 26(a) to 26(c) illustrate waveform diagrams illustrating the acceleration of the machining head, that of the machining table and the relative acceleration of the two available when the machining table at a stop is moved in a +X direction where no vibration measures has not been taken.
Figure 26:
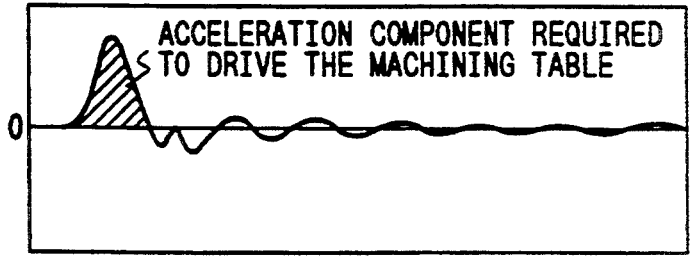
Figure 26:
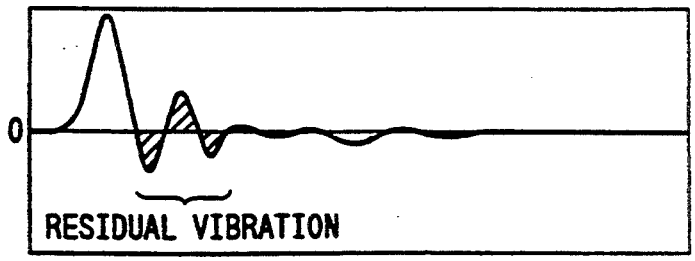

The operation of the apparatus constructed as described above according to the present invention for executing the positioning control method will now be described with the appended drawings. As described above, when the machining table 4 at a stop is started in the +X-axis direction, the relative acceleration $\alpha X - \beta X$ of the machining table 4 and machining head 261 is represented by the waveform as shown in FIG. 26(c). The detrimental residual vibration shown in the hatched portion may be suppressed by operating on the compensation torque command value 1, which will decrease the relative acceleration, by means of the torque compensator 12, adding the result of operation to the output τ0 of the torque command operation unit 13, and giving the result of addition to the torque controller 15 as a new torque command value τ*. The operation of the torque compensator 12 will be described specifically with reference to FIG. 2. Note that if it is assumed that the first driving apparatus 2 generates driving torque which moves the machining table 4 in the +X direction shown in FIG. 1 and the first acceleration detector 10 and second acceleration detector 11 output positive detection values in response to +X direction acceleration when a positive torque command value τ* is given to the torque controller 15, the acceleration waveform of polarity as shown in FIGS. 26(a) to 26(c) should be provided when the machining table 4 is started in the +X direction.

In the torque compensator 12 shown in FIG. 2, the subtractor means 20 receives the acceleration αX of the machining table 4 and the acceleration βX of the machining head 261 and outputs relative acceleration αX−βX. The proportional amplifier 21 multiplies said relative acceleration αX−βX by compensation gain K1 and outputs the compensation torque command value τ1. Then, the adder 14 adds the output τ0 of the torque command operation unit 13 and the output τ1 of the torque compensator 12 and outputs a new torque command value τ*. The torque controller 15 controls the torque of the first driving apparatus 2 according to the torque command value τ* which is the output of the adder 14. In the above structure, if the polarity of the compensation gain K1 of the proportional amplifier 21 is made negative, the torque component proportional to the inverse-polarity signal of relative acceleration αX−βX is added to the output of the torque command operation unit 13, whereby the residual vibration included in relative acceleration αX−βX shown in FIG. 26(c) can be suppressed.

The suppression of the residual vibration will now be described in the case where the torque compensator 12 shown in FIG. 3 is used. The proportional amplifiers 30, 31 multiply the output of the first acceleration detector 10 and the output of the second acceleration detector 11 by compensation gains K1a and K1b, respectively, and the subtractor 20 outputs a difference between the outputs of the proportional amplifiers 30 and 31.

Figure 4:
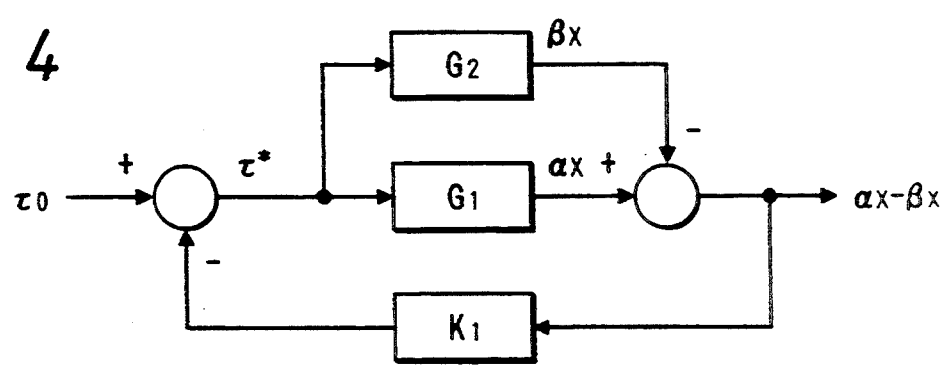
FIG. 4 is a block diagram which illustrates the effects of the invention.

The reason why the residual vibration included in the relative acceleration can be suppressed will now be described in more detail. Suppose that G1 is a transmission function from the torque command value τ*, or the output of the adder 14, to the acceleration αX of the machining table 4 and G2 is a transmission function from the same to the acceleration βX of the machining head 261. If the torque compensator 12 employed is the one in the embodiment in FIG. 2, a block diagram illustrating the function of torque command operation unit 13 output and relative acceleration αX−βX is as shown in FIG. 4, wherein a transmission characteristic from the torque command value τ0 to relative acceleration αX−βX is as indicated by the following expression 1.

$$\alpha X - \beta X = \frac{G1 - G2}{1 - K1(G1 - G2)} \tau 0 \quad (1)$$

where $K1 < 0$

An increase in compensation gain K1 in the above expression increases the denominator value and decreases relative acceleration αX−βX, which indicates that the residual vibration included in the relative acceleration can be suppressed.

Figure 5:
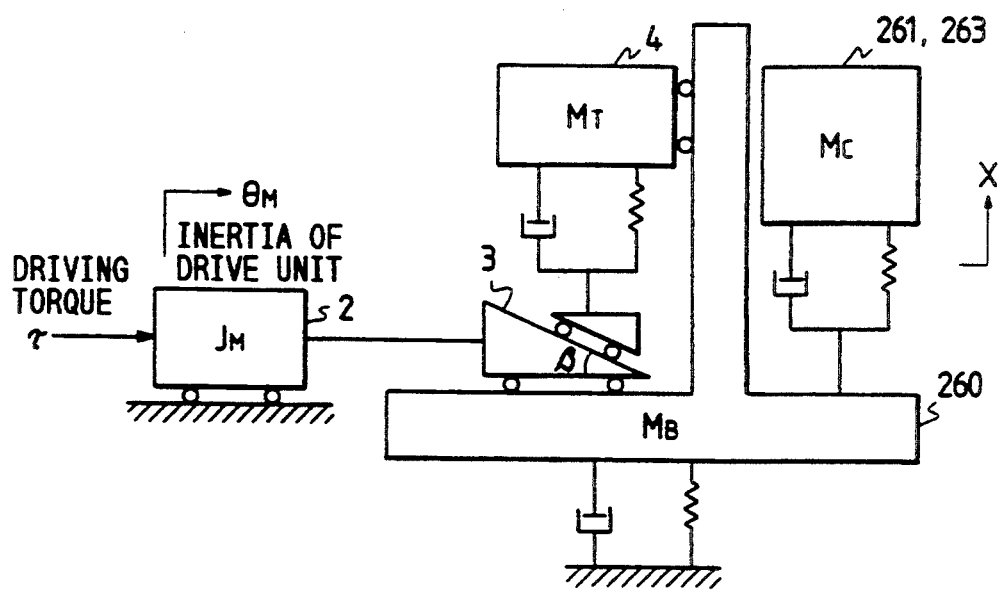
FIG. 5 is a block diagram of a vibration model of the machine tool.
Figure 7:
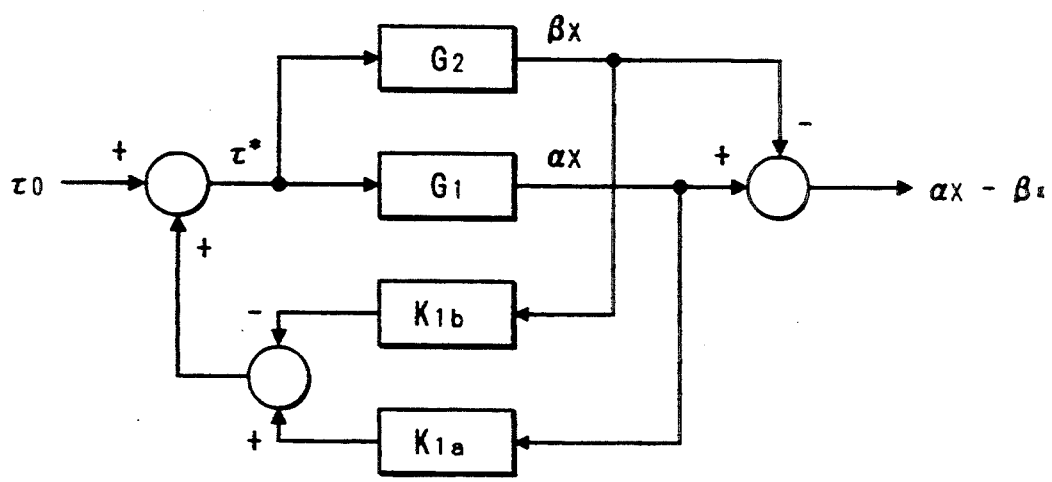
FIG. 7 is a block diagram which illustrates the effects of the invention.
Figure 25:
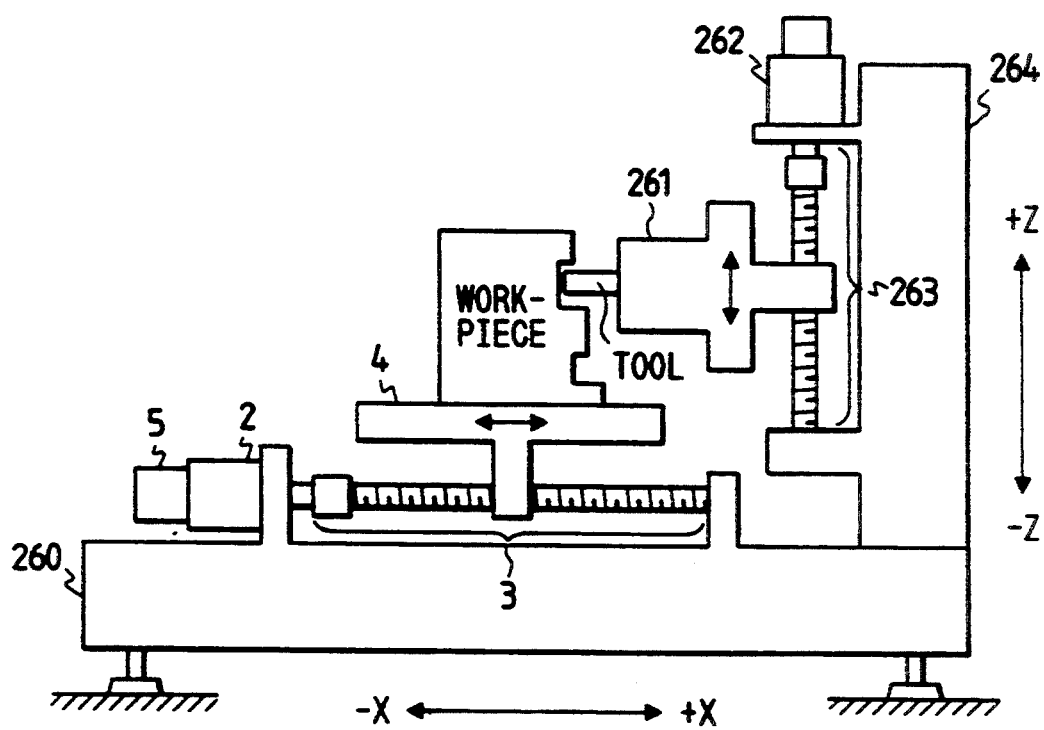
FIG. 25 is a diagrammatic view illustrating a simplified machine tool.

This will be further confirmed by simulation. An example of a vibration model in the X-axis direction of the diagrammatic view of the machine tool shown in FIG. 25 is illustrated in FIG. 5. Using this model, the simulation result of each response at a time when the machining table 4 is driven will now be described. FIGS. 6(a) to 6(c) show the response waveform of relative acceleration αX−βX. This drawing indicates that an increase in compensation gain K1 reduces the residual vibration components included in relative acceleration αX−βX. If the torque compensator 12 used is the one in the embodiment shown in FIG. 3, a block diagram illustrating a function from torque command value τ0 to relative acceleration αX−βX is as shown in FIG. 7, and further a transmission characteristic is as indicated by the following expression (2).

$$\alpha X - \beta X = \frac{G1 - G2}{1 - (K1_a G1 - K1_b G2)} \tau 0 \quad (2)$$

where
$K1_a < 0$
$K1_b < 0$

An increase in compensation gains K1a, K1b in the above expression increases the denominator value and decreases relative acceleration αX−βX, which indicates that the residual vibration included in the relative acceleration can be suppressed.

Figure 8:
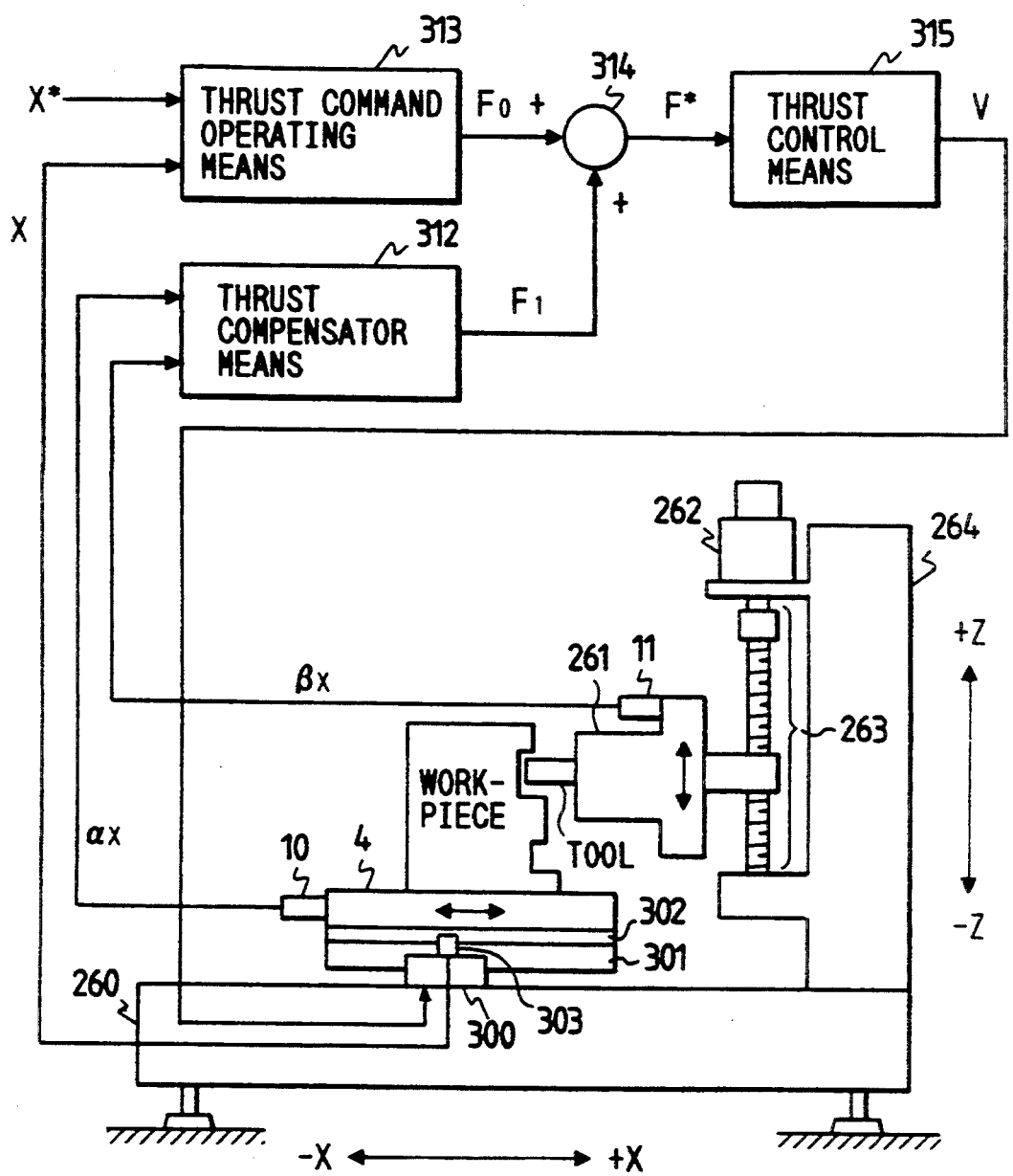
FIG. 8 is a block diagram wherein a positioning control apparatus applies to a machine tool, illustrating another embodiment of the invention.

FIG. 8 illustrates a second embodiment wherein the positioning control apparatus of the invention applies to a machine tool having a linear motor-driven travel mechanism. In FIG. 8, 300 indicates a stator of an X-axis linear motor secured to the bed 260, 301 designates a movable element of the X-axis linear motor secured to the machining table 4, 302 denotes a scale of a linear scale fitted to the machining table 4, 303 represents a head of the linear scale fitted to the bed 260 for detecting the position of the machining table 4, 312 shows thrust compensator for receiving output αX of the first acceleration detector 10 and output βX of the second acceleration detector 11 and for outputting compensation thrust command value F1 to reduce relative vibration acceleration αX−βX of the machining table 4 and the machining head 261, 313 indicates thrust command operating unit for outputting thrust command value F0 to reduce position deviation X*−X on the basis of position command value X* given from the outside and position X of the machining table 4 or the output of the head 303 of the linear scale, 314 denotes an adder for adding compensation thrust command value F1 to thrust command value F0 to output new thrust command value F*, and 315 represents a thrust control unit for supplying power to the X-axis linear motor consisting of the stator 300 and the movable element 301 on the basis of thrust command value F* to control thrust generated thereby.

It should be noted that the thrust working on the machining table 4 is proportional to the torque of the motor for driving said machining table 4 and the torque described in each drawing of Embodiment 1 may be replaced by the thrust in Embodiment 2. It would be obvious to one of ordinary skill in the art that the other embodiments disclosed herein involving torque may also be embodied in linear motor arrangements where thrust replaces torque as a variable.

Figure 10:
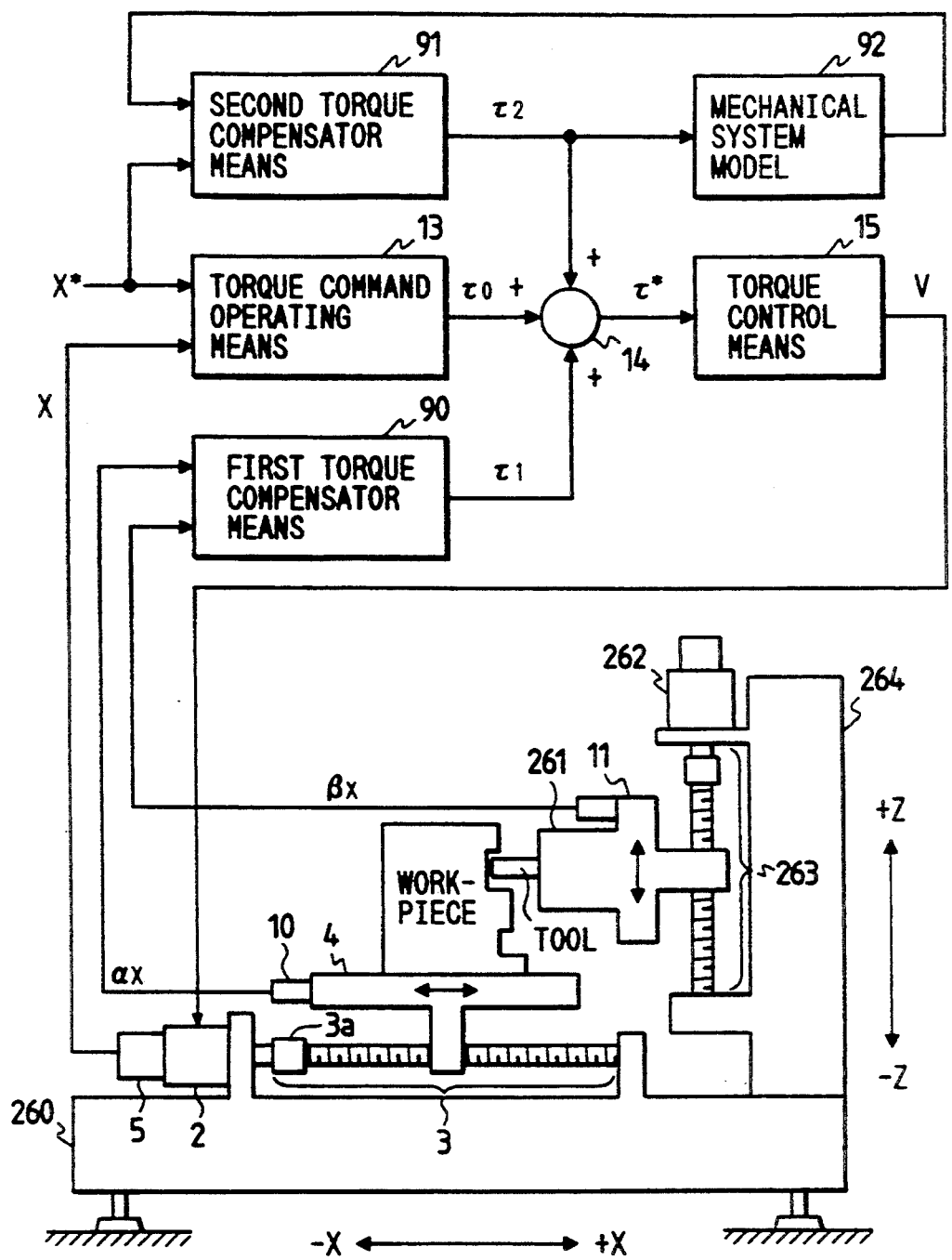
FIG. 10 is a block diagram wherein a positioning control apparatus according to another embodiment of the invention applies to the machine tool.

Incidentally, with reference to the linear motor subsystem of the type illustrated in FIG. 8, it may be seen to be equivalent to a rotary motor system as seen in FIG. 10 where there is a bed 260 that supports a motor 2, a table 4 and a ball screw 3 coupled by a coupler 3a to the motor for driving the table having a workpiece mounted thereon. Specifically, the conversion of linear movement to rotational movement may be understood by reference to the applicable load inertias. In such case, the equivalent load inertia for the linear motor is $J_1$ and is given by the following expression (3):

$$J = J_M + J_C + J_B + \left(\frac{l_b}{2\pi}\right)^2 (M_T + M_W) \quad (3)$$

where
- $J_M$: inertia of the motor [kg.m²],
- $J_C$: inertia of the coupling [kg.m²],
- $J_B$: inertia of the ballscrew [kg.m²],
- $M_T$: mass of the table [kg],
- $M_W$: mass of the work [kg],
- $l_B$: lead of the ballscrew [m]

In the case where $M_W$ is small, it may be ignored and where it is significant, it may be calculated or measured by an operator for insertion into the equation.

As described above, the effect of vibration suppression by the present invention is made higher by increasing the compensation gains of the torque compensator 12 or thrust compensator 312. As shown in FIG. 26(c), however, since the relative acceleration also includes the hatched acceleration component in FIG. 26(b) required to drive the machining table 4, setting the compensation gains too high will reduce the response of the machining table 4 to position command value X*. This is also indicated by the fact that relative acceleration $\alpha X - \beta X$ is zeroed by setting the values of the compensation gains, for example, infinite in Expressions (1) and (2). The confirmation of this fact by simulation using the model in FIG. 5 is shown in FIGS. 9(a) to 9(c). This drawing shows the results of simulation of the relative displacement of the machining table 4 and machining head 261 at a time when the machining table 4 is moved by a predetermined value. FIGS. 9(a) to 9(c) show that whereas an increase in compensation gain K1 reduces the residual vibration components, overshoot occurs, causing a disadvantage. Further features of the invention which will be described below are designed to solve such a disadvantage.

A third embodiment of the invention will now be described with reference to FIGS. 10 to 13. FIG. 10 is a block diagram showing an example wherein a positioning control apparatus according to the invention applies to a machine tool. Referring to FIG. 10, 90 indicates a first compensator, e.g., first torque compensator, which is equivalent to the torque compensator 12 or thrust compensator 312 shown in FIG. 1 or FIG. 8. 91 designates a second compensator comprising second torque compensator which operates on and outputs a second compensation value, e.g., second compensation torque 2, according to a position-related command value, e.g., position command value X*, and model output XM from a model outputting unit such as a mechanical system model which will be described later. Also, 92 indicates a model outputting unit which operates on and outputs the output XM of the model in response to the second compensation torque 2 entered. The model outputting unit 92 regards the first driving apparatus 2, first transmission 3 and machining table 4 simply as load inertia and outputs a model position approximated by a double integral element. The other parts are identical to those shown in FIG. 1 or FIG. 8 and therefore will not be described here.

Figure 11:
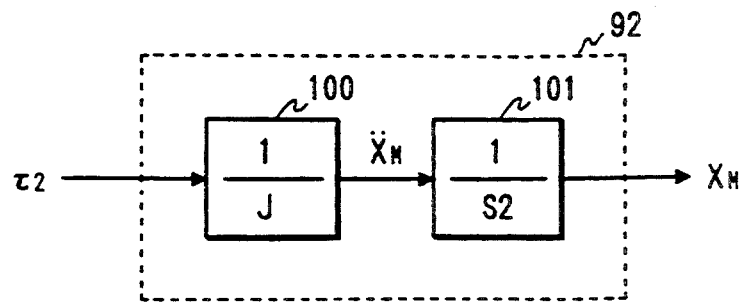
FIG. 11 is a block diagram illustrating a preferred embodiment of a mechanical system model.

FIG. 11 shows an embodiment of the arrangement of said model outputting unit 92, wherein 100 indicates proportional amplifier which multiplies the second compensation torque command 2 by the reciprocal of load inertia J, and 101 denotes double integration unit which integrates the output of the proportional amplifier 100 twice. Here, load inertia J is the result of addition of the inertia of the first driving apparatus 2 converted to the equivalent value at the shaft from the first transmission 3 and machining table 4 and the rotor inertia of the first driving apparatus 2.

Figure 12:
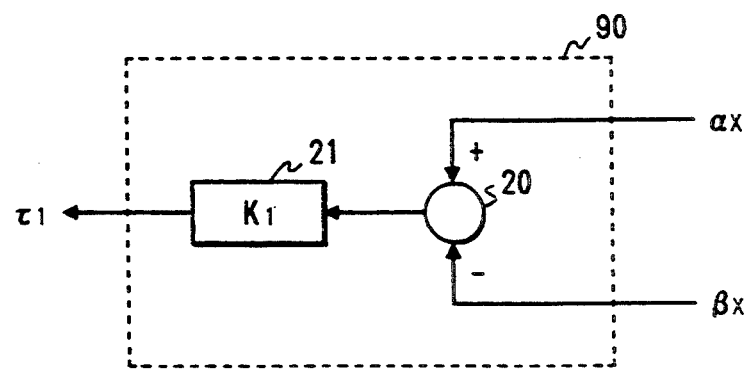
FIG. 12 is a block diagram illustrating a preferred embodiment of first torque compensator means.

FIG. 12 shows an embodiment of said first torque compensator 90, which is identical in structure and operation to the torque compensator 12 shown in FIG. 2 and therefore will not be described here.

Since the model outputting unit 92 must not be vibratory, the first driving apparatus 2, first transmission 3 and machining table 4 are modeled simply as load inertia which is nearly equivalent to the sum of the inertia of the first driving apparatus 2 converted to the equivalent value at the shaft from the first transmission 3 and machining table 4 in FIG. 10 and the rotor inertia of the first driving apparatus 2. The value of this load inertia is set to J. The proportional amplifier 100 outputs the acceleration XM of the model outputting unit 92 by multiplying the second compensation torque command 2 by the reciprocal of the load inertia value J. The double integration unit 101 outputs model position XM by integrating acceleration XM twice.

The operation of the apparatus constructed as described above according to the above described embodiment of the invention will now be described. The second torque compensator means 91 serves to control the model position XM of the model outputting means 92 with a desired response to the position command value X*. Since the model outputting means 92 models the first driving apparatus 2, first transmission means 3 and machining table 4 as single load inertia J as described previously, the output 2 of the second torque compensator means 91 becomes a torque component required to control simple load inertia J with a desired response without a vibration characteristic, friction, etc.

Then, the first torque compensator 90, which operates like the torque compensator 12 or thrust compensator 312 in FIG. 1 or FIG. 8, receives accelerations $\alpha X$, $\beta X$ and outputs the compensation torque command value $\tau 1$ which will reduce relative vibration. The adder 14 adds the output $\tau 0$ of the torque command operation unit 13, the output $\tau 1$ of the first torque compensator 90 and the output $\tau 2$ of the second torque compensator 91, and outputs the result of addition as a new torque command value $\tau^*$. In the above arrangement, the second torque compensator 91 mainly takes charge of the component of fundamental torque required to drive the machining table 4, and the first torque compensator 90 mainly takes charge of the component which suppresses the relative vibration of the machining table 4 and machining head 261. Accordingly, since the fundamental torque component to drive the machining table 4 is maintained by the second torque compensator 91, if the gain of the first torque compensator 90 is increased to enhance a vibration suppressing effect, the response of the machining table 4 to the position command value X* does not reduce unlike the apparatus of the embodiment previously described.

Figure 13:
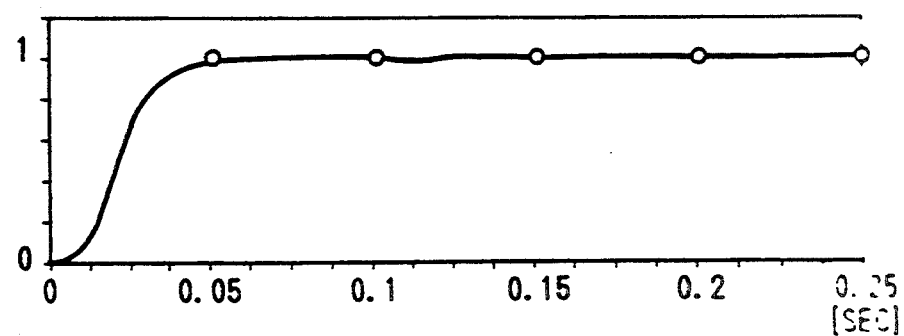
FIG. 13 is a relative acceleration simulation waveform diagram of the machining table and machining head, which illustrates the effect of a preferred embodiment of the invention.

This will further be described by simulation. FIG. 13 shows the relative displacement response waveform of the machining table 4 and machining head 261 obtained when the machining table 4 is moved by a certain value. While the increase of the compensation gains resulted in overshoot as shown in FIG. 9(c) in the apparatus according to the second embodiment of the invention, FIG. 13 shows that the increase of compensation gain K1 in the third embodiment of the invention allows the residual vibration components to be suppressed with the response characteristic protected.

Figure 14:
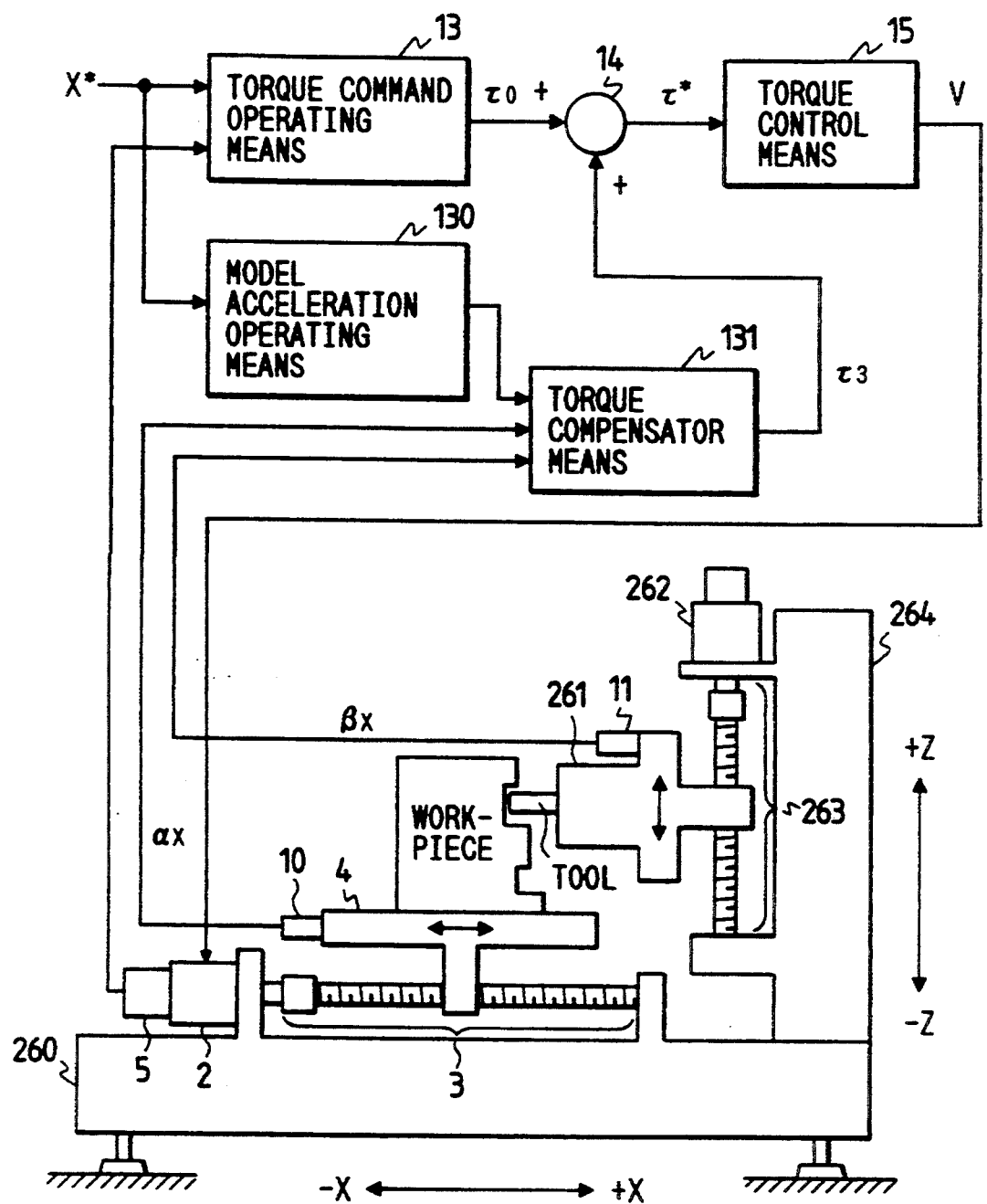
FIG. 14 is a block diagram wherein a positioning control apparatus according to a further embodiment of the invention applies to the machine tool.

A fourth embodiment will now be described in accordance with FIGS. 14 to 21. FIG. 14 is a block diagram illustrating an example wherein a positioning control apparatus according to a fourth embodiment of the invention applies to the machine tool. Referring to FIG. 14, 130 indicates model acceleration operation unit acting to provide a model output and 131 designates a compensator such as a torque compensator. The other parts are identical to those shown in FIG. 1 or FIG. 8 and will not be described. Here, the model acceleration operation unit 130 operates on acceleration applied to a simple load, which does not have a vibration characteristic, at a time when the load is controlled in accordance with a response required for the machining table 4 to the position command X*, and outputs the result of operation as model acceleration αM. If the actual machine tool does not have a vibration characteristic, the relative acceleration αX−βX of the machining table 4 and machining head 261 should be equal to the model acceleration αM. By taking a difference between model acceleration αM and the relative acceleration αX−βX of the machining table 4 and machining head 261, detrimental vibration components can be detected. Also, the torque compensator means 131 operates on difference αM−(αX−βX) between model acceleration αM and relative acceleration αX−βX, and outputs the compensation torque command τ3 having polarity which will reduce the difference. The adder 14 adds the compensation torque command τ3 to the output τ0 of the torque command operation unit 13 and outputs the result of addition as a new torque command τ*.

Figure 15:
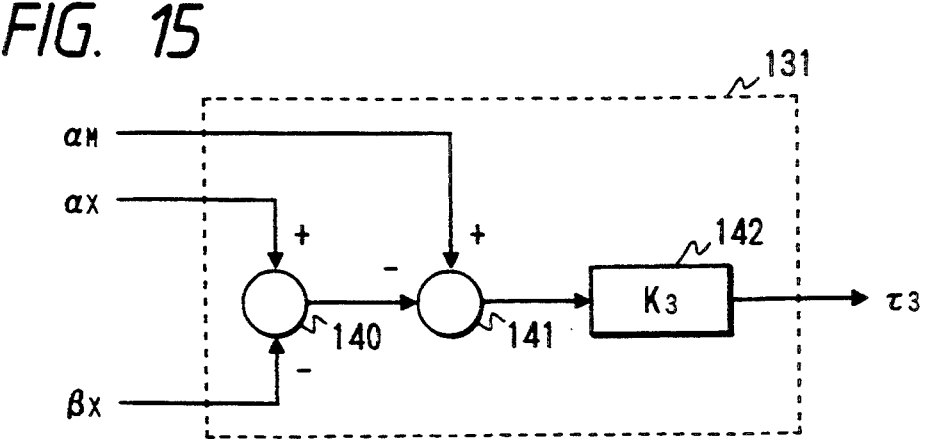
FIG. 15 is a block diagram illustrating a preferred embodiment of torque controller means.

FIG. 15 shows an embodiment of said torque compensator 131. Referring to FIG. 15, subtractor 140 detects the relative acceleration αX−βX of the machining table 4 and machining head 261, and subtractor 141 detects the difference αM−(αX−βX) between model acceleration αM and relative acceleration αX−βX, i.e., detrimental vibration acceleration components occurring between the machining table 4 and machining head 261. Proportional amplifier means 142 multiplies the difference αM−(αX−βX) by compensation gain K3 and outputs the compensation torque command τ3 having polarity which will reduce that detrimental vibration. In the above arrangement, if the polarity of compensation gain K3 of the proportional amplifier 142 is made positive, the torque component proportional to the signal of polarity of the difference αM−(αX−βX) is added to the output of the torque command operation unit 13, whereby the residual vibration included in relative acceleration αX−βX shown in FIGS. 6(a) to 6(c) can be suppressed.

Figure 16:
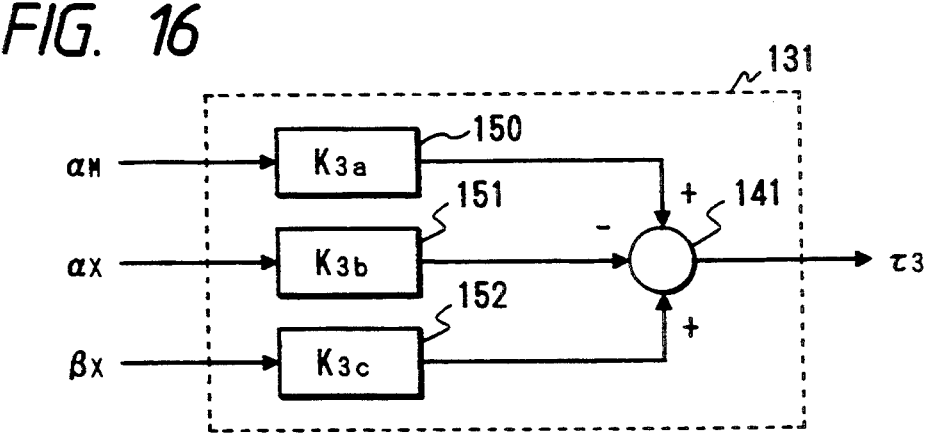
FIG. 16 is a block diagram illustrating another preferred embodiment of torque controller means.

Another embodiment of said torque compensator 131 is shown in FIG. 16. In this case, since the gains of proportional amplifiers 150 to 152 can be set independently to each acceleration, the gains can be adjusted according to the ratio of contribution to each acceleration on the basis of torque generated by the first driving apparatus 2, offering more appropriate vibration suppression. In this case, the polarity of compensation gains K3a to K3c is negative.

Figure 17:
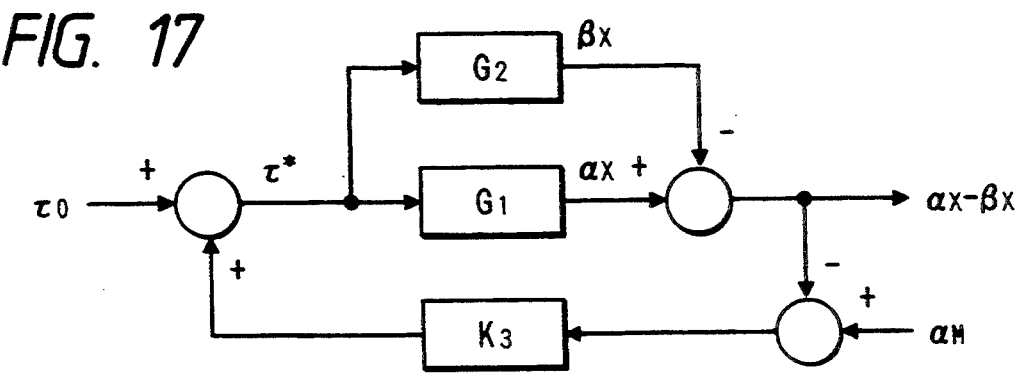
FIG. 17 is a block diagram which further illustrates the effects of the invention.
Figure 18:
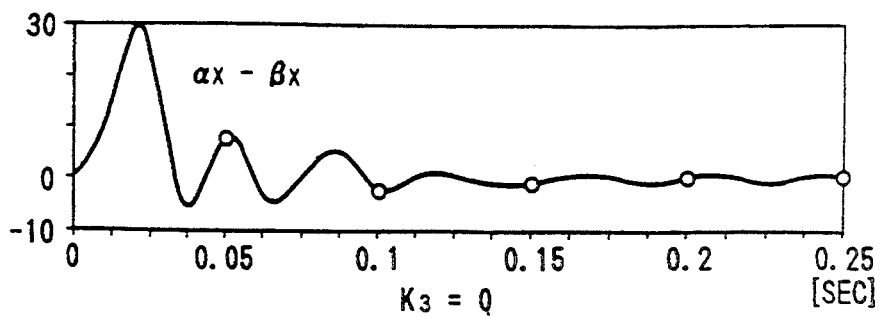
FIGS. 18(a) to 18(d) illustrate relative acceleration simulation waveform diagrams of the machining table and machining head, which also illustrates the effects of the invention.
Figure 18:
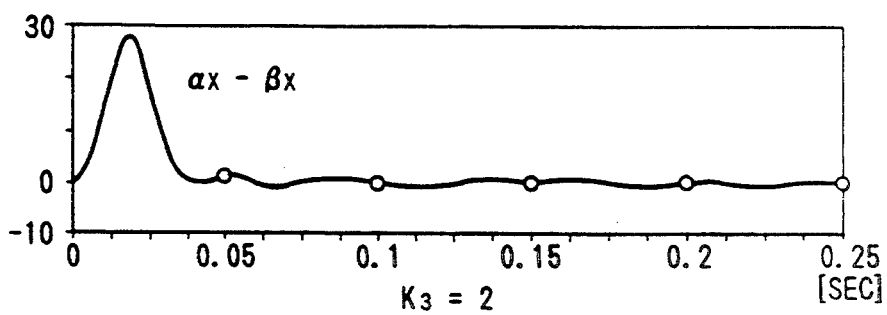
Figure 18:
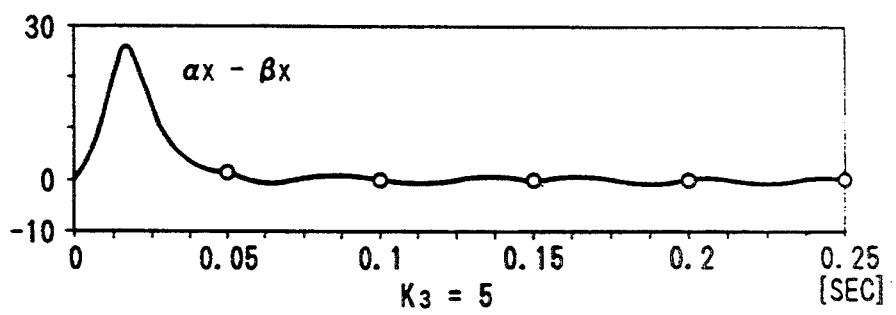
Figure 18:
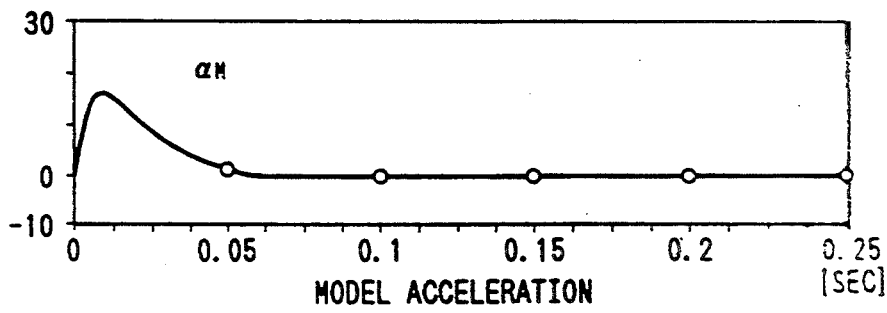
Figure 20:
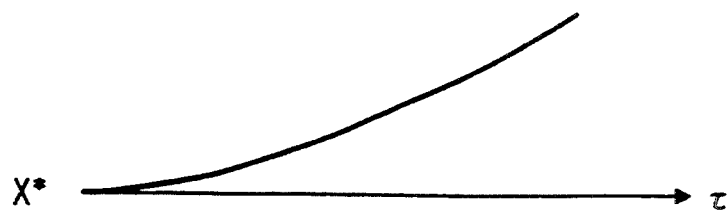
FIGS. 20(a) to 20(d) illustrate waveform diagrams which illustrates the relationships of model acceleration, the relative acceleration of the machining table and machining head, and detrimental vibration components detected as their differences to a position command.
Figure 20:
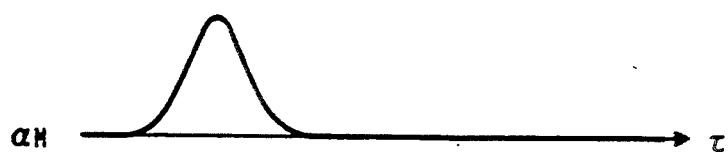
Figure 20:
Figure 20:

The reason why the residual vibration included in the relative acceleration can be suppressed by the apparatus according to the fourth embodiment of the invention arranged as described above will now be described in more detail. Suppose that G1 is a transmission function from the torque command value τ* to the acceleration αX of the machining table 4 and G2 is a transmission function from o the same to the acceleration βX of the machining head 261. If the torque compensator 131 used is the one in the embodiment in FIG. 15, a block diagram illustrating a relationship between model acceleration αM and relative acceleration αX−βX is as shown in FIG. 17, wherein a transmission characteristic from model acceleration αM to αX−βX is as indicated by the following expression (4).

$$\alpha X - \beta X = \frac{K3(G1 - G2)}{1 + K3(G1 - G2)} \alpha M \qquad (4)$$

where $K3 > 0$

If, for example, compensation gain K3 is made infinite in Expression (4), relative acceleration αX−βX is equal to model acceleration αM. Namely, since an increase in compensation gain K3 brings the relative acceleration closer to the model acceleration which does not include vibration components, detrimental residual vibration between the machining table 4 and machining head 261 can be suppressed. This will further be confirmed by simulation. FIGS. 18(a) to 18(c) show the response waveforms of relative acceleration αX−βX obtained when the machining table 4 is driven. This drawing indicates that an increase in compensation gain K3 reduces the residual vibration components included in the relative acceleration and brings the waveform of the relative acceleration closer to that of the model acceleration. FIGS. 19(a) to 19(c) show the relative displacement response waveforms of the machining table 4 and machining head 261 obtained when the machining table 4 is moved by a given value. While the increase of the compensation gains resulted in overshoot as shown in FIG. 9(c) in the apparatus according to the second embodiment of the invention, FIG. 19(a) to 19(c) indicate that the increase of compensation gain K3 in the present embodiment of the invention allows the residual vibration components to be suppressed with the response characteristic protected. The structure of the torque compensator means 131 can also be described similarly in the embodiment of FIG. 16 and therefore it will not be described here.

FIG. 20(a) to 20(d) show relationships of model acceleration αM, the relative acceleration αX−βX of the machining table 4 and machining head 261, and detrimental vibration components detected as difference αM−(αX−βX) to the position command X*.

The embodiment of the model acceleration operation means 130 can operate on model acceleration αM from the position command X* according to the following transmission function. Now if, in the control of the machining table 4, the response bandwidth of velocity control is designed to be Wv rad/s and the response bandwidth of position control to be Wp rad/s, the transmission function from position command X* to model acceleration αM is given by the following expression, where S is a differential operator.

$$\frac{\alpha M}{X^*} = \frac{W_P W_V S^2}{S^2 + W_V S + W_P W_V} \quad (5)$$

The above expression can be modified into the following expression (6).

$$\alpha M = -W_V \frac{\alpha M}{S} - W_P W_V \frac{\alpha M}{S^2} + W_P W_V X^* \quad (6)$$

Figure 21:
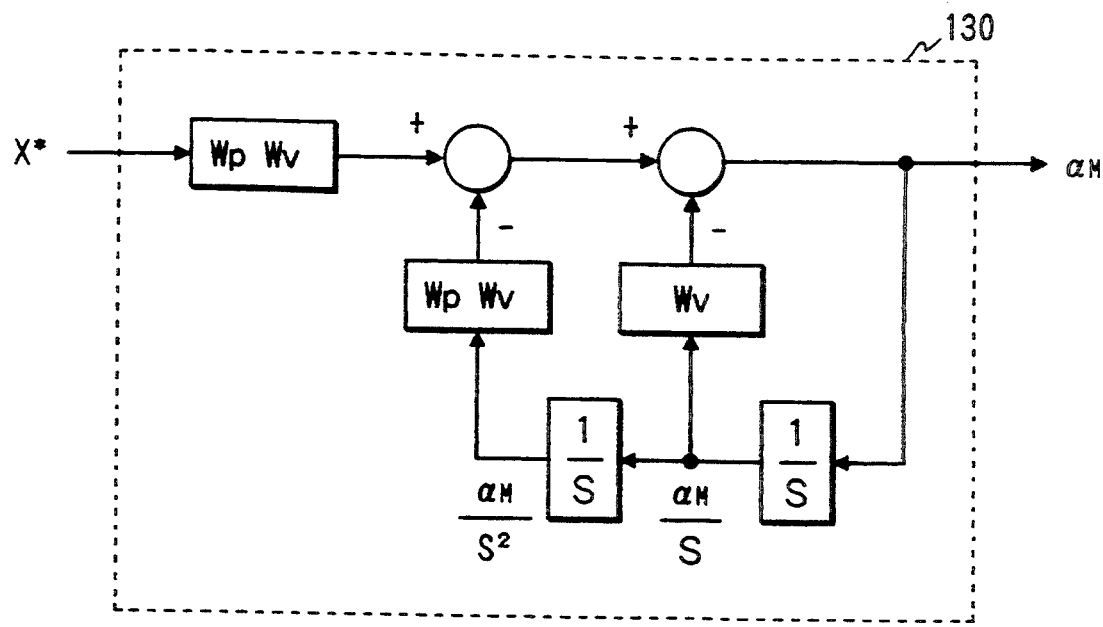
FIG. 21 is a block diagram illustrating a preferred embodiment of model acceleration operation means.

A block diagram corresponding to Expression (6) is shown in FIG. 21.

Figure 23:
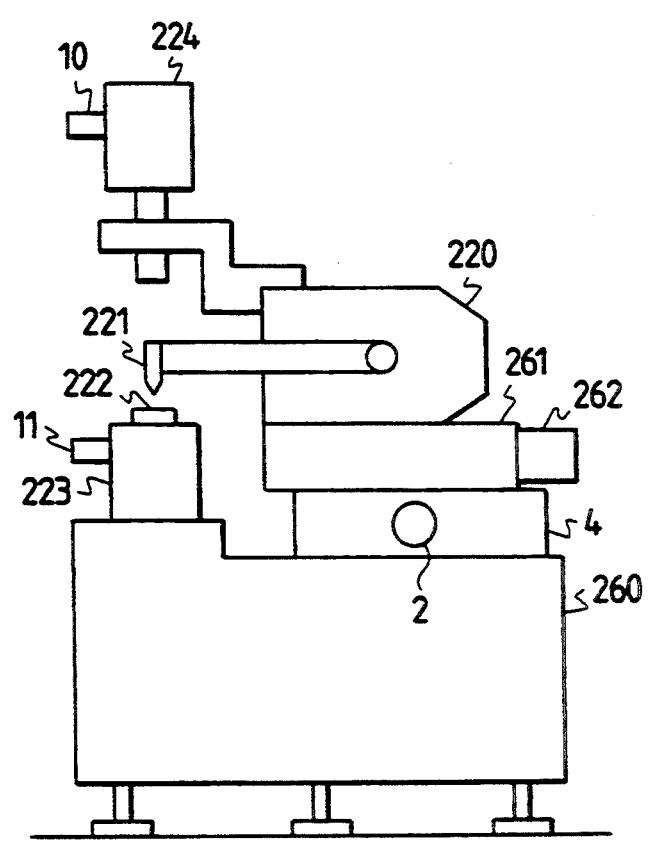
FIG. 23 is an arrangement diagram illustrating a case where the present invention applies to a wire bonding apparatus.
Figure 24:
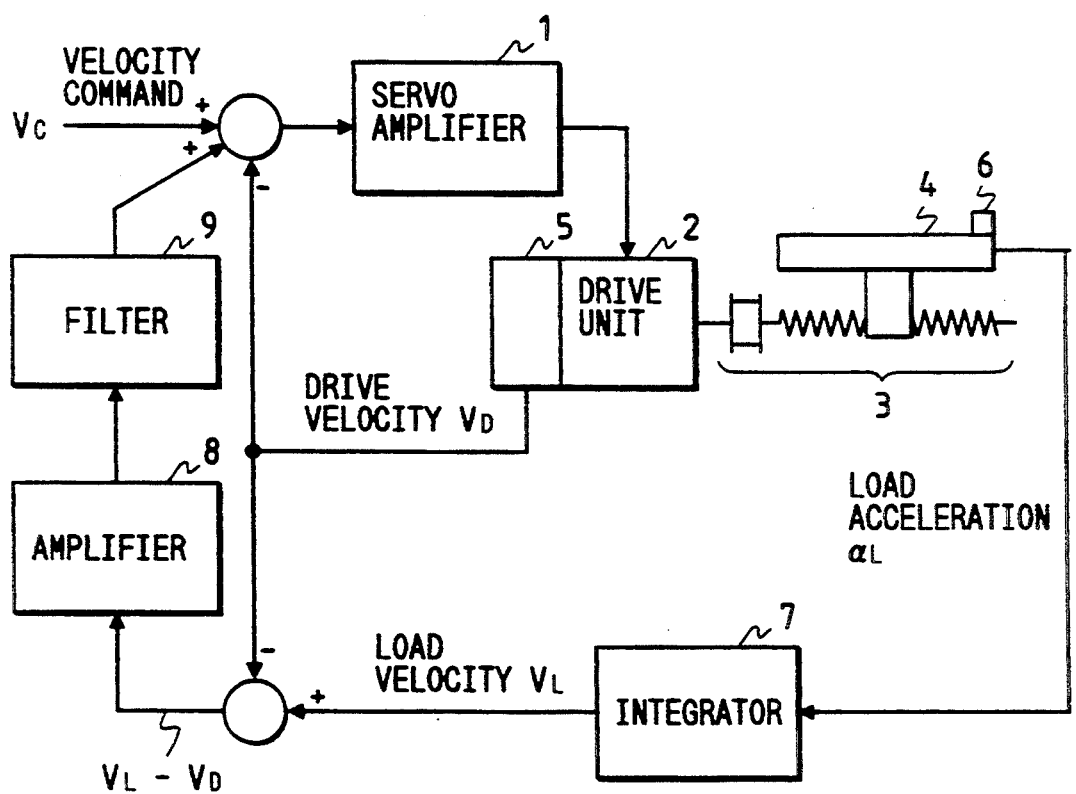
FIG. 24 is a block diagram illustrating a positioning control apparatus known in the art.

FIG. 23 illustrates a case where the present invention applies to a wire bonding apparatus. In FIG. 23, 220 indicates a wire bonding head, 221 shows a capillary mounted to the wire bonding head 220, 222 represents an IC chip, 223 denotes a carrier for holding the IC chip 222, and 224 indicates a television camera. The other parts are identical to those in any of said embodiments and given identical reference characters without further explanation. The operation of the apparatus in accordance with the present embodiment arranged as described above will now be described.

The television camera 224 detects the bonding position of the IC chip 222 and an X-Y table moves the wire bonding head 220 at high speed. Then, the capillary 221 bonds the wire to the IC chip 222 gripped by the carrier 223. When the wire bonding head 220 is positioned at high speed, residual vibration takes place between the television camera 224 and the carrier 223 due to insufficient machine rigidity. To suppress this residual vibration and accomplish rapid positioning control, control as described in said embodiment is exercised with the first acceleration detector 10 and second acceleration detector 11 installed to the television camera 224 and carrier 223, respectively.

While the machine tool having two movable parts in the X and Z axes was employed as an example in each of the previous embodiments, the present invention produces an identical effect on the suppression of detrimental relative vibration between optional two axes which will hinder fast, precise positioning control from being achieved on any machine tool having three or more movable parts.

Figure 22:
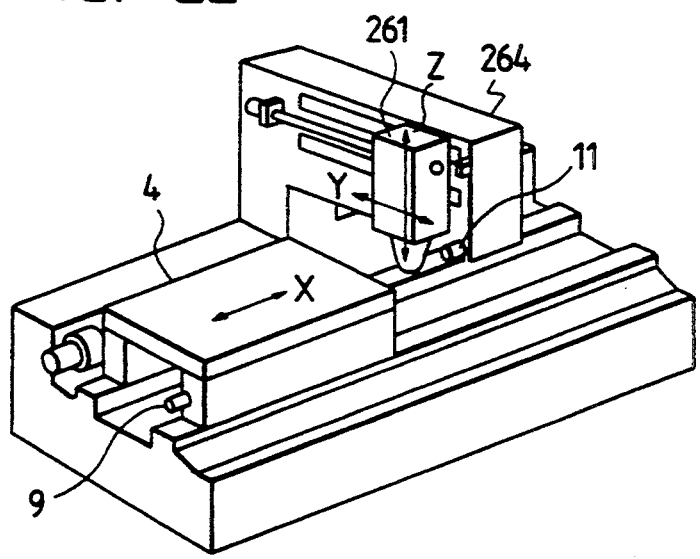
FIG. 22 is an arrangement diagram illustrating a case where the present invention applies to a laser cutting machine.

It will be appreciated that in each of the previous embodiments, the second acceleration detector 11 need not be installed to the second movable part itself and may be mounted to a position where the equivalence of the acceleration component in the first axis direction of the second movable part can be detected. For example, as shown in FIG. 22 which is an arrangement diagram of a laser cutting machine, the second acceleration detector installed on the column 264, not on the machining head 261, allows the acceleration component of the machining head 261 in the moving direction of the machining table 4, i.e., the equivalence of the acceleration component in the first axis direction of the second movable part to be detected.

In this laser cutting machine, the machining head 261 and the area including the laser beam correspond to the tool member in the present invention.

Whereas the first acceleration detector means 10 was installed on the machining table 4 in each of said embodiments, the acceleration of the machining table 4 acting as the first movable part can be detected on an equivalent basis by differentiating twice the position detection output of a linear scale mounted to directly detect the position of the machining table 4 on the machine tool or the like.

While the acceleration component was described as a signal related to the moving position of the movable part in each of said embodiments, the present invention is not 45 limited to said acceleration component and may use an acceleration component calculated from the signal of velocity, position or other component. Accordingly, it should be understood that the present invention covers any and all design modifications falling within the scope of the technological concept of the invention.

It will be apparent that the invention, as described above, achieves a fast, precise positioning control method which allows the relative vibration of a first movable part and a second movable part to be suppressed. Hence, if the first movable part is moved at higher speed, the accuracy of positioning control is protected from vibration.

It will also be apparent that the invention also achieves high-speed accurate positioning control apparatuses which allow the relative vibration of a first movable part and a second movable part to be suppressed. Therefore, if the first movable part is moved faster, the accuracy of positioning control is protected from vibration.

What is claimed is:

1. A positioning control method for a machine tool apparatus having a movable member for supporting one of a workpiece and a tool and for moving on a first member in a moving direction, and a second member for supporting the other of said workpiece and tool and being coupled to said first member, comprising the steps of:
   providing a first acceleration component comprising the acceleration component of at least one of said movable member or the one of the workpiece and tool fitted to said movable member in said moving direction;
   providing a second acceleration component comprising the acceleration component of at least one of said second member or the other of the workpiece and tool fitted to said second member in said moving direction; and
   suppressing the relative vibration of said movable member and said second member in said moving direction on the basis of said first and second acceleration components.

2. The positioning control method as set forth in claim 1, wherein at least one of said providing steps comprises detecting an acceleration component directly.

3. The positioning control method as set forth in claim 1, wherein at least one of said providing steps comprises detecting one of a position and velocity component and calculating therefrom at least one of said acceleration components.

4. The positioning control method as set forth in claim 1, wherein said suppressing step further comprises determining a torque command value, calculating a first torque compensation value from said first and second acceleration components, and controlling on the basis of said torque command and torque compensation values the driving of said movable member in said moving direction.

5. The positioning control method as set forth in claim 1, wherein said suppressing step further comprises determining a thrust command value, calculating a first thrust compensation value from said first and second acceleration components, and controlling on the basis of at least said thrust command and first thrust compensation values the driving of said movable member in said moving direction.

6. The positioning control method as set forth in claim 5, wherein said suppressing step further comprises increasing the gain of a compensation value applied to at least one of said first and second acceleration components.

7. The positioning control method as set forth in claim 6, further comprising modeling an output torque or thrust component required to control a simple load inertia with a desired response without at least one of vibration or friction, and applying said modeled output torque or thrust component to said controlling step.

8. The positioning control method as set forth in claim 1, wherein said suppressing step further comprises:
fitting to said movable member one of said workpiece and said tool for machining said workpiece; arranging said movable member to be movable on said first member; and fitting the other of said workpiece and tool to said second member coupled with said first member.

9. The positioning control method as set forth in claim 1, wherein said suppressing step further comprises increasing a compensation gain value which allows residual vibration to be suppressed while protecting a desired response characteristic.

10. A positioning control apparatus comprising:
a movable member fitted with one of a workpiece and a tool member for machining said workpiece and arranged to be movable on a first member in a moving direction;
first means for determining the acceleration component of at least one of said movable member or one of the workpiece and tool member fitted to said movable member;
a second member coupled with said first member and fitted with the other of said workpiece and tool member;
second means for determining the acceleration component of at least one of said second member of the other of the workpiece and tool member fitted to said second member in said moving direction of said movable member; and
vibration suppressor means responsive to said first and second means for suppressing the relative vibration of said movable member of one of the workpiece and tool member fitted to said movable member and said second member or the other of the workpiece and tool member fitted to said second member in said moving direction.

11. A positioning control apparatus as set forth in claim 10, wherein each of said first and second means comprises means for detecting at least one of acceleration, velocity and position data.

12. A positioning control apparatus as set forth in claim 11, wherein at least one of said first and second means further comprises means for calculating said acceleration component from at least one of velocity and position data.

13. A positioning control apparatus comprising:
a movable member which is designed to be movable on a first member and is fitted with one of a workpiece and a tool member;
first determining means for determining the acceleration component of said movable member in a moving direction;
drive means for providing a driving force to said movable member in said moving direction;
position component detector means for detecting the position component of said movable member driven by said drive means or one of the workpiece and tool member fitted to said movable member in said moving direction;
command operating means for operating on a drive command according to a command related to a position and the detected position component of said position component detector means;
drive control means for receiving the drive command from said command operating means to control said drive means in said moving direction;
a second member coupled with said first member and fitted with the other of the workpiece and tool member;
second determining means for determining the acceleration component of said second member or the other of the workpiece and tool member fitted to said second member in said moving direction; and
compensator means responsive to the acceleration component of said first determining means and the acceleration component of said second determining means and operating on a compensation value for suppressing the relative vibration of said movable member or one of the workpiece and tool member fitted to said movable member and the second member or the other of the workpiece and tool member fitted to said second member in said moving direction.

14. A positioning control apparatus as set forth in claim 13, wherein said compensator means modifies the drive command to said drive means.

15. A positioning control apparatus as set forth in claim 13, wherein said compensator means comprises:
first compensator means for receiving the acceleration component of said first determining means and the acceleration component of said second determining means and operating on a first compensation value for suppressing the relative vibration of said movable member or one of the workpiece and tool member fitted to said movable member and the second member or the other of the workpiece and tool member fitted to said second member in said moving direction to compensate the drive command to said drive means;
model position output means providing a model position component in said moving direction; and
second compensator means for operating on a second compensation value according to a position-related command and the model component from said model position output means to provide a compensation output for determining the drive command to said drive means 16. A positioning control apparatus as set forth in claim 13, wherein said compensator means comprises:
model acceleration output means for receiving said command related to a position and providing a model acceleration component in said moving direction; and first compensator means receiving the acceleration component of said first determining means, the acceleration component of said second determining means, and the output of said model acceleration output means and operating on a compensation value for suppressing the relative vibration of said movable member or one of the workpiece and tool member fitted to said movable member and the second member or the other of the workpiece and tool member fitted to said second member in said moving direction in order to compensate the drive command to said drive means.

17. A positioning control apparatus as set forth in claim 13, wherein at least one of said first and second determining means each comprises means for detecting at least one of acceleration, velocity or position in said moving direction.

18. A positioning control apparatus as set forth in claim 13, wherein said drive means is a linear motor.

* * * * *